Fig. 1

Oct. 26, 1937.   A. ATHIMON   2,097,011
AUTOMATIC CHANGE SPEED DEVICE
Filed Sept. 3, 1935   5 Sheets-Sheet 4

Patented Oct. 26, 1937

2,097,011

UNITED STATES PATENT OFFICE 2,097,011

AUTOMATIC CHANGE-SPEED DEVICE

Alfred Athimon, Paris, France

Application September 3, 1935, Serial No. 39,043
In France September 12, 1934

15 Claims. (Cl. 74—336)

The present invention has for its object a change-speed device with automatically variable speed ratios, chiefly intended for use on motor vehicles. Said change-speed device is so constructed that, when a certain set of gears giving a certain speed ratio is operative, an increase or a decrease of the resisting torque applied to the driven shaft, beyond a predetermined limit, causes another set of gears, having another speed ratio to become automatically operative.

One object of the invention is to devise an automatic change speed device of this character which will be simple and compact in construction, reliable and efficient in operation and relatively inexpensive to manufacture.

Another object of the invention is to provide an automatic change speed device of the type referred to, which shall be responsive both to variations in resisting torque and vehicle speed.

A further object of the invention is to provide means whereby the gears will be synchronized or substantially synchronized at the instant they come into meshing engagement.

Further objects and advantages of the invention will be set forth in the following description. Although the examples of construction hereinafter described are chiefly designed for use upon motor vehicles, they may be used in all cases where it is desired to transmit power under variable speed ratios. Obviously, the invention is not limited to a specific number of speed ratios.

In the accompanying drawings, which are given by way of example.

Fig. 6ᵃ is a partial plan view of said other coupling member showing also partially the roller race and the obturating ring of the first coupling member in section.

Fig. 12 shows in elevational view one embodiment of a connecting device whereby said gas throttling device may operate without affecting the position of the accelerator pedal.

Figure 1:
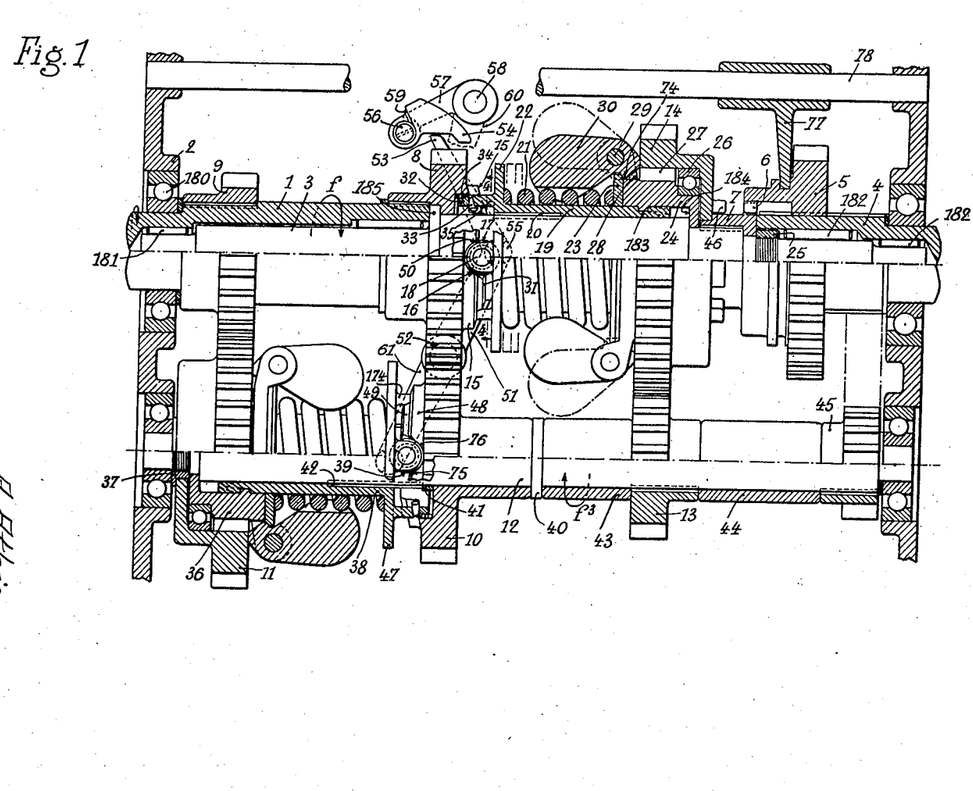
Fig. 1 is an elevational view, partially in section, of one embodiment of an automatic gear box according to the invention.

In the example shown in Fig. 1, 1 denotes a hollow driving shaft, mounted in a ball bearing 180 of the gear box casing 2. It will be supposed that said driving shaft rotates in the direction of the arrow $f$. Within shaft 1 is rotatably supported, by roller bearings 181, one end of an intermediate shaft 3, whose other end is rotatably supported by rollers 182, within a hollow driven shaft 4.

In the position shown in the drawings, (forward drive with direct coupling) shaft 3 is coupled with shaft 4 through a sliding gear-wheel 5, keyed to shaft 4, but slidable thereon, and a clutch member 7 keyed to shaft 3 and provided with radial clutch teeth engaging mating teeth 6 provided within a lateral extension of gear 5.

To driving shaft 1 are keyed two pinions 8 and 9, meshing respectively with two other pinions 10 and 11, mounted on a countershaft 12 in the manner hereinafter described. The diameters of the pinions are such that the speed imparted by shaft 1 to pinion 10 is greater than the speed imparted by said shaft to pinion 11. For slow speed ratios, rotation of counter-shaft 12 is transmitted to intermediate shaft 3 and thence to driven shaft 4 through pinions 13 and 14, pinion 13 being keyed to countershaft 12 and pinion 14 being connected either to shaft 3 or 4 as hereinafter described.

In the direct drive position shown in the drawings, driving shaft 1 is connected to shaft 3 by means of a coupling or torque limiting device adapted for automatic release, which is constructed as follows: pinion 8, keyed to driving shaft 1, is formed laterally with a cylindrical clutch flange 15 (Figs. 1 and 4 to 8) whose end face is formed with notches 16, adapted to receive conical rollers 17 (Fig. 6) rotatably mounted upon pivot pins 18, carried by a coupling sleeve 19; sleeve 19 is keyed to shaft 3, but is axially slidable upon the key 20. Rollers 17 are normally pressed and held in the notches 16 by a calibrated spring 21 whereby shaft 1 is coupled to shaft 3 through pinion 8 and flange 15; spring 21 bears at one end upon a flange 22 of sleeve 19, and at the other end, through a washer 23, upon a nut 24 screwing upon sleeve 19 at 183 but which is held axially between a shoulder of shaft 3 and the clutch member 7 above referred to, which is held axially by a nut 25. Shaft 3 is provided with a collar 185, adapted to absorb the axial thrust imparted to pinion 8 by spring 21, acting through rollers 17 and flange 15; it will be seen that the tension of spring 21 is thus taken up at one end by member 7 and shaft 3, through nut 25, and at the other end by the collar 185 of shaft 3 through rollers 17, shoulder 15 and pinion 8; this arrangement avoids the use of a thrust ball bearing which would otherwise be necessary to take up the axial thrust of pinion 8.

The direction of the threads 183 connecting nut 24 with sleeve 19 is such that sleeve 19 moves towards the right (Fig. 1) when nut 24 rotates in the direction of the arrow $f$ with reference to sleeve 19.

Nut 24 is arranged within pinion 14 and connected therewith by a roller bearing 26 and a free wheel or one-way connection 27, in such manner that pinion 14 will rotate freely in the contrary direction to the arrow $f$ with respect to nut 24; on the contrary, nut 24 is rotated by pinion 14 through the free wheel when said pinion rotates in the direction of the arrow $f$ with reference to nut 24; free wheel 27 may consist of rollers operating in corresponding recesses of either member 14 or 24. Said conventional construction has not been represented in detail.

Within clutch flange 15 of pinion 8 is arranged a backing ring 32, provided with teeth 31, and which is movable both axially and circularly. The amount of rotation of said backing ring 32 is limited by studs 33, secured to flange 15, and engaging teeth 31.

Figures 4, 6, 15, 16:
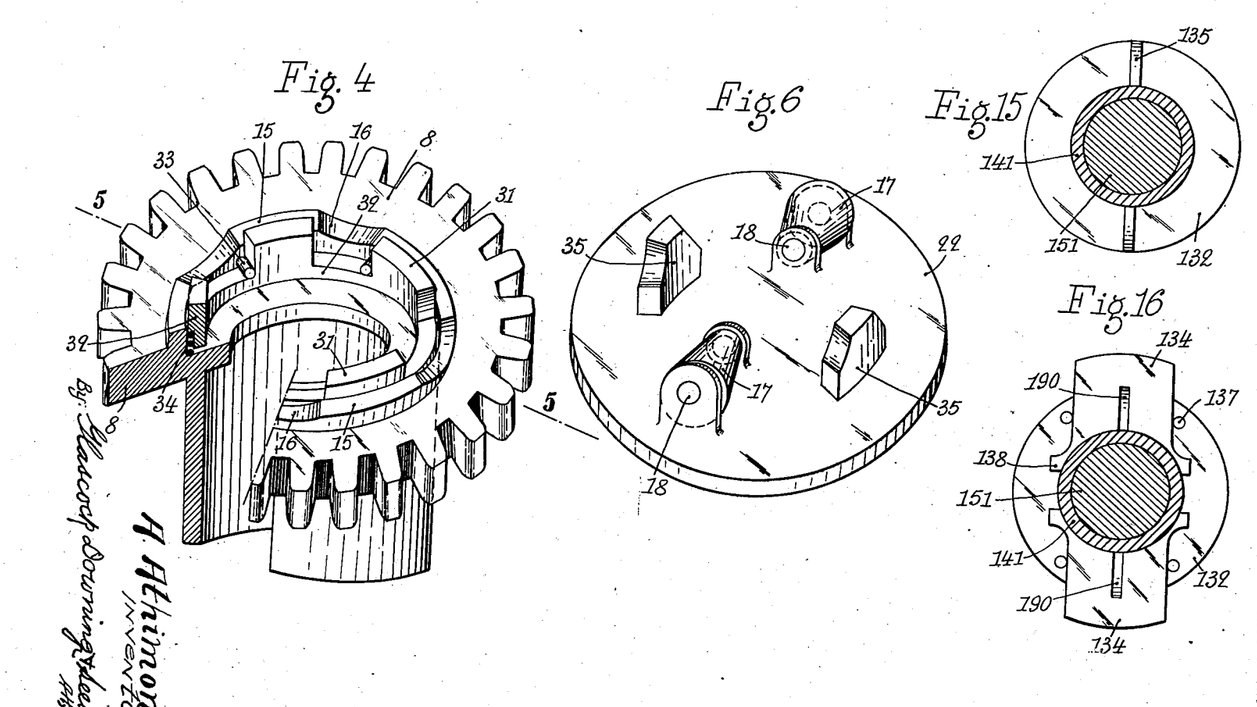
Fig. 4 is a perspective view of one of the coupling members of the coupling device.
Fig. 6 is a perspective view of the other coupling member of the coupling device.
Fig. 15 is an elevational view of the centrifugal masses used in the embodiment of Fig. 3.
Fig. 16 is an elevational view of a washer provided with ribs cooperating with the centrifugal masses shown in Fig. 15.
Figure 7:
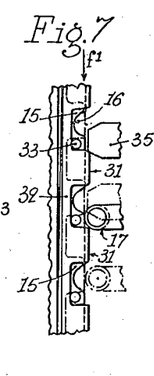
Figs. 7 and 8 are diagrams representing the development of the roller race of the coupling device.
Figures 8, 9, 10, 11, 13:
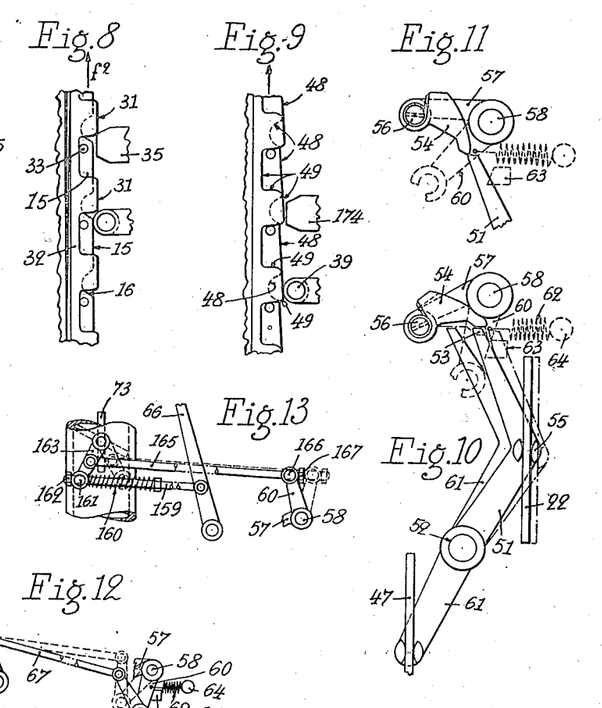
Fig. 9 is a diagram showing the development of the roller race or races of the coupling device or devices mounted on the counter-shaft.
Figs. 10 and 11 are elevational views showing two different positions of the automatic gas throttling device for reducing the admission of gas to the engine.
Fig. 13 shows in elevational view a modification of said connecting device.

In the position of Fig. 1, rollers 17 are engaged in notches 16 of flange 15 and pinion 8 is locked in rotation with sleeve 19 and shaft 3 under the action of spring 21. In the position of Fig. 7, rollers 17 are disengaged from notches 16 against the tension of spring 21, due to a relative rotation between flange 15 and rollers 17 (in the manner hereinafter described), but said rollers are ready to snap again into said notches if a reverse relative rotation takes place between flange 15 and rollers 17. The purpose of backing ring 32 is to prevent undue re-coupling of flange 15 with rollers 17, by filling up notches 16 and forming a substantially continuous race for rollers 17, said race comprising alternately the upper ends of teeth 31 and the edge of flange 15, between consecutive notches (Fig. 8). Rollers 17 have such a width as to ride both on flange 15 and teeth 31 (Fig. 6).

In order to pass from the position of Fig. 7 to the position of Fig. 8, backing ring 32 will have to rotate in the direction of arrow $f^1$ (Fig. 7) and, to resume the position of Fig. 7, it will have to rotate in the direction of arrow $f^2$ (Fig. 8).

Figure 5:
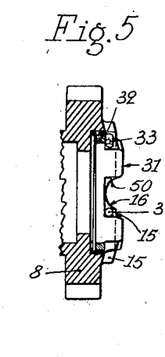
Fig. 5 is a section on the line 5—5 of Fig. 4.

Sleeve 19 is formed, between consecutive rollers 17, with projections 35 and ring 32 is urged towards said projections 35 by a helical spring 34 (Figure 1); studs 33 limit the outward movement of ring 32, as may be seen in Fig. 1 or 5.

So far described, the operation is as follows: with the parts in the position shown in Fig. 1, driving shaft 1 is locked in rotation with shaft 3 by rollers 17 engaging notches 16. If the resisting torque imparted to shaft 3 exceeds a given limit, determined by the tension of spring 21 and the inclination of the lateral wall 50 of notches 16, the axial component of the pressure of said walls upon said rollers cause the latter to leave the notches, thus disconnecting shaft 1 from shaft 3 (Fig. 7). Shaft 1 rotating in the direction of arrow $f$ (Fig. 1) the direction of movement of the portion of flange 15 situated behind the plane of Fig. 1 is that shown by arrow $f^2$ in Fig. 8. The relative motion of sleeve 19 with respect to flange 15 is thus shown by arrow $f^1$ in Fig. 7 and projections 35 thus move ring 32 in the direction of arrow $f^1$ until said ring is arrested by studs 33 (position shown in dotted lines in Fig. 7) and forms, together with flange 15, a continuous race for rollers 17; at this stage, recoupling of pinion 8 with sleeve 19 is prevented.

On counter-shaft 12 is mounted a pinion and clutch unit similar to the unit just described. Pinion 11 is mounted on nut 36 (like pinion 14 on nut 25), by means of a one-way connection or free wheel in such manner as to rotate loosely upon said nut in the contrary direction to the arrow $f^3$, and to drive said nut 36 when said pinion rotates in the direction of arrow $f^3$. Nut 36 is held axially on countershaft 12 by a nut 37; a coupling sleeve 38, similar to sleeve 19, is slidably keyed at 42 on counter-shaft 12.

Pinion 10 is associated with a coupling device with automatic release similar to the one above described, except that the race sections of clutch flange 48 (similar to flange 15) and the ends of the teeth of ring 49 (similar to ring 32) are somewhat sloping, as shown in Fig. 9. Pinion 10 is connected with shaft 12 through rollers 39 (similar to rollers 17) engaging notches formed in a flange 174 of sleeve 38; it is held laterally upon counter-shaft 12, on the one hand by a collar 40 of said shaft and on the other hand by a ring 41 which is itself held axially by the key 42 of sleeve 38.

It will be seen that, when the resisting torque imparted to shaft 12 exceeds a given limit, rollers 39 leave the notches of flange 48, thus disconnecting said shaft from pinion 10.

Two spacing sleeves 43 and 44 are adapted to maintain the proper axial position of pinion 13 and of a back motion pinion 45.

The operation is as follows. In the position of direct drive shown in Fig. 1 (third speed in the present example), driving shaft 1, rotating in the direction of the arrow $f$, actuates driven shaft 4 through rollers 17 (pressed in notches 16 by spring 21) sleeve 19, shaft 3, clutch ring 7 and pinion 5. In this position, pinion 8 rotates counter-shaft 12 in the direction of the arrow $f^3$ through pinion 10, rollers 39, and ring 38. Pinion 13 imparts to pinion 14 an angular speed which is less than that of nut 24, rotating in unison with the driving shaft 1 (owing to the speed ratio of the pinions 8, 10, 13, 14). Pinion 14 will thus rotate idle on free wheel 27. On the other hand, pinion 9 (whose diameter is less than that of pinion 8) which acts upon the loose-wheel pinion 11, imparts to pinion 11 an angular speed which is less than that of counter shaft 12, whereby pinion 11 will rotate idle on its free wheel.

The vehicle running on direct drive, when the resisting torque reaches a sufficient value to overcome the tension of spring 21, rollers 17 are driven out of their recesses, as above explained. Rollers 17 will then roll upon the race of flange 15, and studs 35 (see Fig. 7, position in full lines) will drive ring 32 to the position shown in the dotted lines, in which teeth 31 form a backing for rollers 17 at the time when they pass over the notches 16 of flange 15.

As will be seen in dot-and-dash lines in Fig. 7, the rollers now turn as if race 15 were continuous, since rollers 17 will bear alternately upon race 15 and upon teeth 31 of member 32, the latter being pressed down to the level of the race of flange 15 by the tension of spring 21 acting upon the teeth 31 through the rollers.

This condition is maintained for a very short time, viz., during the time necessary to enable the engine to speed up to a sufficient extent, in order to impart to the loose-wheel pinion 14 a speed which is at least equal to the speed of shaft 4, motion being then transmitted through pinions 8, 10, 13, 14, (second speed). Henceforth, the free wheel rollers 27 will become operative and drive nut 24, which acts by its screw connection upon sleeve 19 to shift the latter to the right and to thus move the same away from flange 15, against the action of spring 21, until sleeve 19 abuts against the shoulder 184 of nut 24. Sleeve 19 will now be rotated in unison with nut 24. Shafts 3 and 4 connected together by clutch ring 7 and pinion 5 will thus drive the vehicle in second speed. Rollers 17 are now inoperative and any increase of the resisting torque will leave the parts in this position.

The device being in the position for the second speed, if the resisting torque still increases and reaches a predetermined value, pinion 10 will become automatically disconnected from countershaft 12, due to rollers 39 being forced out of their recesses 76 by the reaction of the inclined parts 75, against the action of the spring just as described with reference to pinion 8. Backing ring 49 will then close the recesses 76 of flange 48, and pinion 10 will turn loose on its shaft. The speed of the driving shaft 1 increasing, as well as that of pinion 9, the loose-wheel pinion 11 will assume such a speed as to drive screw 36, through its free wheel. At this time, sleeve 38 and rollers 39 are kept away from the roller race due to the screwthreaded connection of nut 36 with sleeve 38. The vehicle now runs in first speed.

The operation of the device for passing from a lower speed ratio to a higher speed ratio will now be described:

Assuming the parts are in the position for the second speed, if the resisting torque decreases to such an extent that the vehicle may be driven on direct drive, the tension of spring 21, acting upon sleeve 19 through flange 22, will exceed the reaction of the screw-thread of nut 24 upon said sleeve 19; the latter will thus be shifted to the left and the rollers 17 will again ride on race 15.

However direct return of rollers 17 into their recesses 16 might occasion a shock in the driving gear of the vehicle, if the recesses 16 for said rollers were rotating at this instant at a much greater speed than the rollers 17 and the driven shaft with which they are connected. It is thus necessary, before resuming the contact, to provide for a reduction of the speed of the engine, in order to prevent the rollers 17 from entering their recesses 16 until the speed of the engine and of the recesses for the rollers is equal to or is somewhat less than the speed of the rollers 17 and of the driven shaft 4.

The change speed device may be of the semi-automatic type, and in such case, slowing down of the engine may be operated by the driver, who momentarily closes off the gas or releases the gas pedal.

An entirely automatic operation is obtained by means of the following device. The flange 22 of sleeve 19 is connected with a lever 51 (Fig. 10) through a fork 55 formed on said lever. Lever 51 is pivotally mounted on a fixed pivot, secured to casing 2, and its end 53 may engage the pointed end of a pawl 54 which is fulcrumed at 56 to a lever 57, pivoted about a fixed pin 58 secured to casing 2. Pawl 54 is urged to the position of Fig. 11 by a spring 59.

Similarly, the flange 47 of coupling sleeve 38 is connected by a fork to a crank lever 61, pivoted at 52; its upper arm has the same shape as the lever 51 and is adapted to act, in the same manner as the lever 51, upon pawl 54 (see Fig. 10).

Rotatable with arm 57 is a lever 60 (see Figs. 10 and 12), urged by a spring 62 upon a stop 63, spring 62 being attached to a suitable attaching member 64.

Movement of the lever 60 is transmitted to the gas throttle of the carburettor of the engine by the following device (Fig. 12): to the end of lever 60 is pivoted a lever 65, inserted in the linkage connecting the accelerator pedal 66 and the throttle lever 69 controlling admission of gas. The pedal 66 is connected with the upper end of lever 65 by a rod 67. A rod 68 connects the lower end of lever 65 with the throttle lever 69, secured to the throttle 73; rod 68 slidably extends through a pivot pin 70 and is urged by a spring 72 in such manner as to press a stop-nut 71 on said rod against pivot pin 70. The usual return spring of the pedal, as well as the spring of the throttle, are not shown.

The operation is as follows: When proceeding from the direct drive to the second speed, flange 22 moves to the right, together with sleeve 19 and thus actuates lever 51, the position being shown by the full lines in Fig. 10, in which the end 53 of lever 51 raises pawl 54, without affecting the throttle control; lever 51 then assumes the position shown in the dot-and-dash lines, and the pointed end of the pawl moves down to a position adjacent the end 53. When the resisting torque decreases, flange 22 returns to the left, and the end 53 of lever 51 engages the pointed end of pawl 54, and rotates the latter together with lever 57, about pivot pin 58, to the position shown in Fig. 11.

The movement thus imparted to lever 57 closes throttle 73 as hereinafter described, without changing the position of the accelerator pedal 66.

When the gas throttle is in the closed position, the engine slows down; however, as long as the engine speed is greater than the speed of shaft 4, backing ring 32 remains in the position shown by the dot-and-dash lines in Fig. 7, and the rollers cannot enter their recesses 16. When the speed of the engine is reduced below this point, the direction in which projections 35 press upon ring 32 is reversed, and said projections rotate ring 32 in the direction of arrow $f^2$, thus releasing roller recesses 16 (see Fig. 8).

When the rollers 17 begin to enter their recesses, lever 51 (see Fig. 11) escapes from the end of pawl 54; this pawl together with levers 57 and 60 resumes the position shown in Fig. 1, thus causing resumption of the engine feeding; the engine will then actuate the shafts 3 and 4 on direct drive.

If the engine fails to operate properly upon a rapid opening of the throttle, return movement of the throttle to the open position may be retarded by any suitable means, for example a hydraulic or pneumatic brake.

The closing movement of lever 57 is transmitted to throttle 73 in the following manner.

The control gear for the throttle assuming the position shown by the full lines (position of complete opening), lever 60, when proceeding from the position shown by the full lines to the position shown by the dotted lines, moves rod 68 and throttle 73 through lever 65 into the closing position, this operation taking place without changing the position of accelerator pedal 66.

If the throttle control gear is in the closed throttle position, movement of lever 60 does not affect rod 68, since lever 69 is at the end of its stroke, and pivot pin 70 slides upon said rod, while compressing spring 72.

Shifting from first to second speed takes place in a similar manner: as soon as the tension of the spring associated with sleeve 38 overcomes the reaction of the screwthread connecting said sleeve with nut 36, sleeve 38 moves toward flange 48 and the projections 174 rotate backing ring 49 in a position where rollers 39 may enter notches 76, provided however the driver has released the gas pedal to slow down the engine.

For the purpose of automatically slowing down the engine when shifting from first to second speed, means may also be provided for controlling automatically the carburettor throttle in response to operation of sleeve 38 on countershaft 12. For this purpose, the flange 37 of said sleeve actuates lever 61 in the same manner as flange 22 actuates lever 51, and the end of lever 61, just like the end of lever 51, is adapted to act upon pawl 54 and thus upon the carburettor throttle.

Movement of lever 60 may also be transmitted to the gas throttle by a modified device, shown in Fig. 13: in this construction, lever 60 is mounted on pivot pin 58 at a different setting from the one disclosed in the arrangement of Fig. 12; said lever 60 coacts with a stop similar to 63, and is urged by a return spring similar to 62, secured to an attaching piece similar to 64 (not shown). Lever 60, rotatable with lever 57, transmits the power to a lever 163 controlling throttle 73, through a rod 165, slidable in a hollow pivot pin 166 and having a stop nut 167. The accelerator pedal 66 acts upon lever 163 through a rod 159, slidable in the hollow pivot pin 161 and urged by a spring 160 in such manner as to press a stop nut 162 of said rod against pivot pin 161.

The operation is as follows: the device assuming the position shown by the full lines (position for the complete opening of the throttle), and lever 60 proceeding to the position shown by the dotted lines, lever 163 and throttle 73 are brought thereby into the closed position, through rod 165; pivot pin 161, sliding upon rod 159, will compress spring 160, without changing the position of pedal 66.

When the throttle initially assumes its closing position, movement of lever 60 has no effect on lever 163, because stop nut 167 is located on rod 165 at a sufficient distance from pivot pin 166, to provide for a lost motion.

In the device so far described, the changes in the speed ratio always take place for determined resisting torques upon the driven shaft, due to the constant action of spring 21 and of the similar spring associated with sleeve 38. Inasmuch as it is desirable to alter the instant of changing the speed ratio, according to circumstances, the device according to the invention comprises means whereby the operation is responsive to variations in the vehicle speed.

Said means comprises centrifugal masses 30 pivoted to nut 24 about pivot pins 29 carried by lugs 28 of nut 24. Said masses are formed with a foot 74, adapted to exert on washer 23 a force which increases the tension of spring 21 at high speed.

It will be seen that the greater the tension of spring 21 the greater will be the resisting torque required to automatically shift the gear box from a given speed ratio to a lower speed ratio. It is advantageous to promote the transfer from a higher to a lower speed ratio in the case in which the speed of the vehicle is reduced (due to a marked reduction of the feeding of the engine, for example) to a point near the speed corresponding to the maximum torque of the engine or to a point near the speed at which jamming of the engine may take place (slow speed running). The centrifugal masses 30 are adapted to increase the tension of the spring 21 at high speeds, as above stated, the tension of said spring falling down to its initial value for the slower speeds. This reduction of the tension of the spring 21 as slow speeds will also facilitate starting, i. e. shifting the slower speeds (with a reduced feeding of the engine); this is important since, upon starting, the system is inoperative, and assumes the position of direct drive or higher speed.

The inward movement of centrifugal masses 30 is limited by the foot 74 when the vehicle travels at the normal speed, whereby said masses are prevented from increasing the tension of said spring beyond a certain limit. The spring is thus unaffected by the speed changes, for this end position of masses 30.

At its normal speed, the vehicle may be in such conditions that it can be driven at will either on direct drive or in second speed.

If the driver wishes to travel at the maximum speed, he will keep the accelerator pedal depressed to the maximum and the automatic change speed gear will proceed to the second combination, as soon as, due to a speed reduction, the power torque will have increased to a sufficient degree to overcome the force of spring 21; said spring is so calibrated as to promote shifting to a lower speed ratio for the maximum speed of the vehicle, with full load on the engine.

On the contrary, if the driver wishes to maintain as long as possible the direct drive, instead of requesting the maximum speed of the vehicle, he will not use the full load on the engine, or he will operate somewhat below the full load, and for this purpose he will abstain from depressing the accelerator pedal to its maximum extent. To change over to the second speed, the vehicle speed will thus have to slow down further, in order to obtain a greater increase of the driving torque, so as to make up for the reduction of load, and to thereby obtain a torque which exceeds the tension of spring 21.

It is obvious that the less the engine increases its torque by reducing its speed, the greater will be the interval between the two speeds at which changing over takes place, for a given reduction of the rate of feeding of the engine.

In order to enable the driver to more readily find the position in which he will run, as far as possible, either on the higher combination, or on the lower combination, the rod 67 of the accelerator pedal (see Fig. 14) may be provided, for example, with a spring 171 having an initial tension, said spring bearing against a washer 170 bearing in turn on a shoulder of rod 67 and being held at the other end by nuts 172. Rod 67 is slidable in a fixed stop 173, against which washer 170 will be applied, in the case of a sufficient angular movement of pedal 66.

Figure 14:
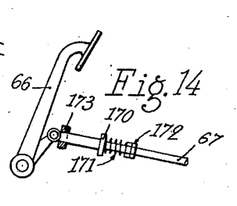
Fig. 14 shows in elevational view a device whereby the end of the stroke of the accelerator pedal is resisted by an additional spring, for the purpose hereinafter explained.

As long as washer 171 does not engage stop member 173, the ordinary return spring of the accelerator pedal (not shown) is the only one which resists depression of the pedal; however when washer 170 engages stop member 173, the tension of spring 171 is added to the tension of the ordinary return spring. The operator will thus be able to readily plot out the two ranges of displacement of the gas pedal, one corresponding to the vehicle running at the maximum speed and the other to running as long as possible on direct drive.

Should the driver desire to further advance the change to the lower combination, for instance, he can do this by clutching out and then re-engaging the usual clutch; the engine speed will thus suddenly increase and cause a somewhat abrupt action upon the transmission gear, which may advance to a certain extent the change to a lower speed ratio; the acceleration thus imparted to the vehicle may assure maintenance on this lower combination. The driver may obtain the same result by a slight and short braking of the vehicle.

In some cases, a rapid action upon the accelerator pedal may also advance shifting to the lower combination.

The action of spring 21, controlling the automatic action of the change to different speeds, is quite stable because said spring acts directly, without the interposition of a friction surface, for instance, and the operation is not dependent upon variations of a coefficient of friction. The permanent deformation to which it may be subjected after a long time of use may be compensated by any suitable regulating means (not shown), which may be readily designed by those skilled in the art. In order to provide for ready replacing of the spring, several springs may be placed for instance about the shaft in lieu of a single spring surrounding the shaft. The action of the centrifugal masses may also be made adjustable.

The inclined walls of the notches, such as 50 for example, will preferably have such an outline as to progressively merge with the roller race, in order that the rollers 17 shall be at once driven towards their race as soon as the tension of spring 21 becomes somewhat less than the action of the resisting torque, thus preventing all movement of the rollers in their recesses, save at the exact points of exit.

It will be noted that, when proceeding from the position of direct drive to the position for second speed, for example, the rollers 17 have been expelled by the reaction of the inclined parts 50, the resisting torque overcoming the pressure of spring 21, increased by the passive resistance of the control devices. If it is desired that the value of the decreasing resisting torque which causes shifting to the higher speed shall be substantially equal to the value of the increasing resisting torque which caused shifting to the lower speed, the screw-thread of members 24 and 19 may be given such a pitch that their action will be slightly amplified (relatively to the inclined parts 50), thus tending to compensate for the passive resistances, taking due account of the increased tension of spring 21. If the system proceeds, for example, to the second speed, at the moment when the screwthreads of members 24 and 19 become operative in order to move rollers 17 away from their races, the acceleration that the engine tends to give to the vehicle may allow a greater action than the one that effected the escape of the rollers. On the contrary, if it is desired to separate the rising and descending points of shifting, the screwthreads of members 24 and 19 may be given such a pitch that their action will be slightly decreased (relatively to the inclined parts 50).

It will be noted that, when shifting from second speed to first speed, during the time between the instant when rollers 39 leave their recesses 76, and the instant when loose wheel 11 begins to operate, nut 24 does not exert any reaction upon the screw thread of sleeve 19 and rollers 17 have a tendency to return toward the roller race of flange 15; however, as the speed of the engine and of flange 15 are much greater than that of rollers 17 and of shaft 4, ring 32 will not allow the rollers to enter their recesses 16.

It should also be noted that in the same circumstance, the end of lever 51 is not liable to act upon pawl 54 and to slow down the engine, since lever 61 has a position corresponding to the position of lever 51 shown in full lines in Fig. 10, that is the pointed end of pawl 54 is raised and cannot be reached by lever 51.

As above described, the roller races of flange 48 and of backing ring 49 are somewhat inclined (Fig. 9) and the purpose of this design will now be explained: In the case of flange 15 and backing ring 32, said ring 32 will always be positively controlled in one direction or the other, either by the studs 33 of flange 15 which rotate in unison with the driving shaft, or by the projections 35 of sleeve 19, which rotate in unison with shaft 3; ring 32 and rollers 17 will thus be always brought back to the engaging position of the coupling device in a positive manner. On the contrary, in the case of flange 48 and backing ring 49, said ring 49 will be positively controlled in one direction by the studs secured to flange 48, connected with pinions 10 and 8 and with driving shaft 1, but it will be driven in the contrary direction by the projections 174, which are connected with sleeve 38 and hence with countershaft 12 and pinions 13 and 14; now pinion 14 is loose, and hence projections 174 will only act by reason of the momentum of the parts in movement. Inasmuch as this action may be insufficient, a slight inclination or slope is given to the roller races of members 48 and 49.

If roller race 48 and ring 49 are moved in the direction of the arrow in Fig. 9, at a greater speed than projections 174 and rollers 39, these latter will act by friction and will maintain loosewheel pinion 14 in action; ring 49 is held in the position shown in Fig. 9, in which it closes the recesses for the rollers 39. When the speed of members 48 and 49 becomes less than that of rollers 39 and projections 174, the action of loose-wheel pinion 14 is interrupted, and rollers 39 are free to descend the slopes; projections 174, whose relative movement on ring 49 is reversed, will move the latter, thus allowing the rollers to enter their recesses.

In the position shown in Fig. 1, the sliding pinion 5 is in the position for forward drive, its clutch teeth 6 being engaged with those of member 7, thus connecting together shafts 3 and 4.

The idle position of the gear box is obtained by shifting the sliding pinion to the right, until its clutch teeth are disengaged from member 7, shaft 3 being thus disconnected from shaft 4. When the sliding pinion is pushed completely to the right, with the pinion now in the position shown by the dot-and-dash lines and next the pinion 45, the gear box assumes the position for back drive. Pinion 5 now engages a pinion or a set of pinions, not shown, which also engages pinion 45 from which pinion 5 receives a reverse motion.

When the sliding pinion is pushed to the left, the clutch teeth 6 engage a set of clutch teeth 46 formed on pinion 14. As the clutch teeth of member 7 are released, shaft 3 can rotate loosely within shaft 4. The movement of driving shaft 1 is thus transmitted by pinions 8, 10, 13, 14 and then directly by clutch teeth 46 to sliding pinion 5 and to shaft 4. As the entire control is positive, in both directions, this permits the braking by the engine. The system is thus prevented from returning to the direct drive, and the second speed becomes the only possible higher speed. This permits, when necessary, to obtain the braking by the engine at this speed. It should be remarked that braking by the engine is always possible on direct drive.

Sliding pinion 5 is displaced by a fork 77, mounted on a rod 78; it can be locked in each position, and controlled by any known means (not shown).

As the gear casing contains only a single pinion, the operating lever of the gear box may be readily located at any point within reach of the driver, for example, on the dashboard.

Figure 2:
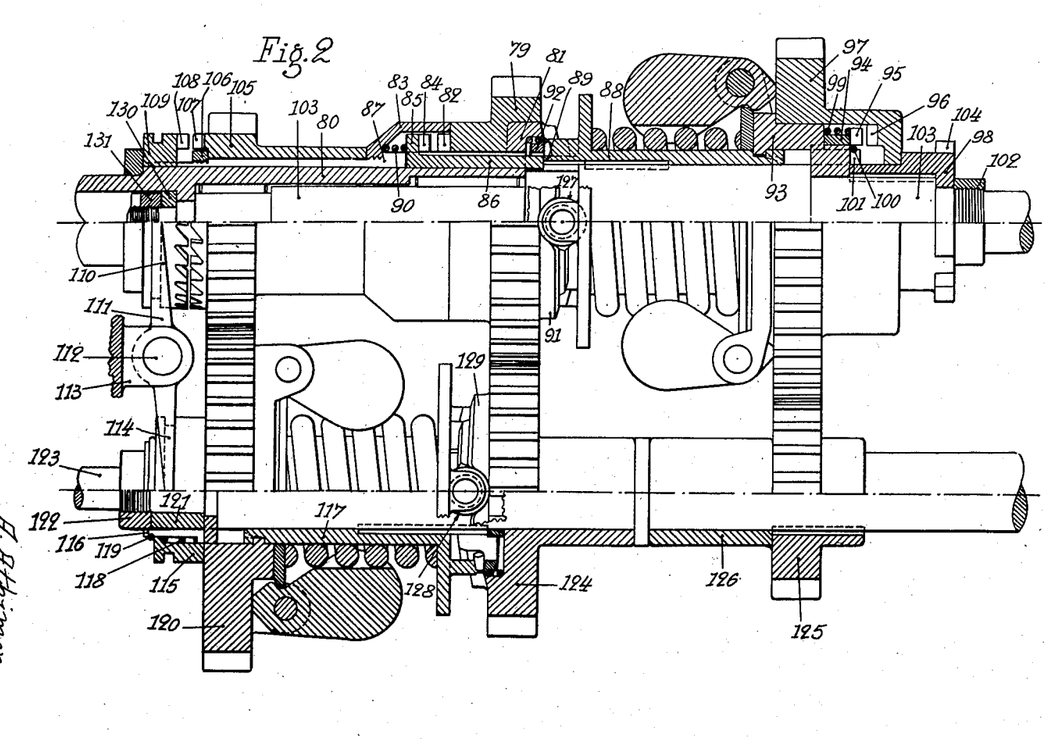
Fig. 2 is an elevational view, with parts in section, of a second embodiment, wherein provision is made whereby the inoperative gear wheels remain stationary when the box is operating on direct drive.

In the modification shown in Fig. 2, use is made of loose wheels of the ratchet type, and the arrangement is such that the gear-wheels which are idle when the vehicle is in direct drive (position shown in Fig. 2) remain stationary. The features which differ from the example shown in Fig. 1 are the following: Pinion 79 is mounted loose on driving shaft 80, connected with the engine; it is held axially, on the one hand by a shoulder 81 of shaft 80, and on the other hand by a hollow nut 83, pressed against a shoulder of shaft 80. Pinion 79 carries laterally a set of ratchet teeth 82, opposite a corresponding set of teeth 84, formed upon a ring 85, provided internally with tongues 86 having the shape of keys and slidable in keyways 87 in shaft 80. A sleeve 88, extended at 89, engages the ends of tongues 86, thus preventing the teeth 84 and 82 from engaging each other under the action of spring 90. The shoulder 81 of driving shaft 80 is suitably perforated to accommodate the ends of tongues 86. Said shoulder carries a coupling flange 91 within which is located a backing ring 92, as in the preceding example (Fig. 1).

To a nut 93, screwing upon sleeve 88, is keyed a ring 94, slidable on member 93. Said ring 94 carries teeth 95, adapted to engage corresponding teeth 96 of a pinion 97, which is loosely rotatable on member 93 and member 98. Ring 94 is urged by a spring 99 towards the teeth 96; it is held apart from the latter by a stop ring consisting, for example, of one or more spiral turns of an elastic material 100, secured to projections 101 of sleeve 88. Said projections 101 are inserted into recesses provided in nut 93.

A member 98 pressed by a nut 102 against a shaft 103, to which it is keyed, serves to maintain the axial position of member 93 and carries clutch teeth 104; in the position for forward drive, said teeth are adapted to engage corresponding teeth on the shaft which is to be driven.

A pinion 105 is mounted loose on shaft 60; it is held laterally by a nut 106 and carries laterally a set of ratchet teeth 107, opposite another set of teeth 108, carried by a disc 109, keyed to shaft 80, but slidable on the latter. Said disc 109 is controlled by a fork 110, secured to a lever 111, pivoted on a pivot pin 112, mounted in a fork 113, secured to the casing (not shown). The lower part of lever 111 carries a fork 114, controlled by a ring 115, which is mounted upon extensions 116 of a sleeve 117, controlling the said ring 115 in an elastic manner.

Said ring 115 is urged by a spring 118 upon a stop ring 119, mounted on the extensions 116; these latter extend through cut-out parts of pinion 120. Pinion 120 is screwed to sleeve 117 and is held laterally by a ring 121 and a nut 122, upon a counter-shaft 123. Shaft 103 carries a ring 130 and a nut 131.

A pinion 124 is connected with sleeve 117 by a coupling device with automatic release, comprising the same parts as those associated with the pinion 10 shown in Fig. 1. A pinion 125, which is held axially by a spacing ring 126 is in gear engagement with pinion 97. The other parts shown in Fig. 2 need not be described in detail, since they have the same construction and function as those described with reference to Fig. 1. The flanges of sleeves 88 and 117 act, through any suitable means, upon an automatic device for slowing down the engine, which may be similar to the one shown in Figs. 10 to 13. Shafts 80, 103 and 123, are suitably supported in a casing, not shown.

The operation is as follows.

On direct drive (position of Fig. 2) pinions 105, 79 and 97 mounted on driving shaft 80 and on shaft 103, connected with the driven shaft, are loose, since the sets of teeth 108, 84 and 95, which are adapted to connect said pinions with the engine shaft 80 and the intermediate shaft 103 are held apart from their corresponding sets of teeth. When the device proceeds from the direct drive to the position for second speed, that is when the rollers 127 leave the recesses of flange 91, the set of teeth 84, which is no longer held apart by the end 89 of sleeve 88, has a tendency to engage the set of teeth 82 under the action of spring 90. On the other hand, the ring 94 with the set of teeth 95 is no longer held by stop ring 100, which moves with sleeve 88 and extensions 101, to the right of Fig. 2, and consequently the set of teeth 95 will have a tendency to engage with the set of teeth 96 under the action of spring 99.

In order to gradually speed up the pinions and the counter-shaft 123, which are stationary when running on direct drive, the teeth 95 will act upon the teeth 96 before the teeth 84 act upon the corresponding teeth 82. Since at this time the teeth 95 will act by their inclined faces upon the teeth 96, they will first slide, thus gradually speeding up the pinions 97, 125, 124, 79 and the counter-shaft; consequently, when the teeth 84 finally engage the corresponding teeth 82, these latter, as well as pinion 79, may have a speed practically equal to that of teeth 84. This is important, considering that the teeth 84 have a tendency to act, in these conditions, immediately by the right-hand side; besides, the outer part of the straight sides of the teeth 84 and 82 is rounded in order to prevent engagement at very different speeds.

As long as the engine will not have reached the speed corresponding to the second speed ratio, the ratchet teeth 95 and 96 will slide by friction upon each other in the contrary direction to their active operation. When the engine attains the corresponding speed, the teeth will move in the proper direction for driving the vehicle.

Upon shifting from second speed to direct drive, sleeve 88 will begin its movement to the left of Fig. 2, thus tending to release the teeth 95 and 84 from their corresponding teeth; however, as the total displacement of sleeve 88 to the right exceeded the displacement necessary for the engagement of the teeth, the movement to the left may commence without any release of these teeth. On the other hand, it has been explained, in the first embodiment of the invention, that the displacement to the left of the sleeve (similar to sleeve 38), causes slowing down of the engine, by means of the device of Figs. 10 to 13. This slowing action, as applied to the present modification, has the effect of eliminating all pressure upon the ratchet teeth, whereby sleeve 88 will cause disengagement of said ratchet teeth when they are no longer operative.

Shifting from the second to the first speed, as concerns the beginning of the action of teeth 108 upon teeth 107, will take place after the same manner as for the other ratchet teeth, taking due account of slight differences of construction. When rollers 128 are driven out of the recesses of flange 129, sleeve 117 moving to the left, will drive with it the ring 115 through its extensions 116, said ring will actuate lever 111, through fork 114, and, through fork 110, lever 111 will move ring 109 to the right, thus engaging teeth 108 with teeth 107, while connecting pinion 105 with driving shaft 80.

As the displacement allowed by teeth 108 is less than the displacement of sleeve 117 to the left, spring 118 will yield according to the difference between these two displacements. When ring 117 returns to the right, that is, after shifting from first speed to second speed, sleeve 117 will move to a certain extent before causing separation of the teeth 108 and 107, for the same reason as above set forth for the other ratchet teeth.

Figure 3:
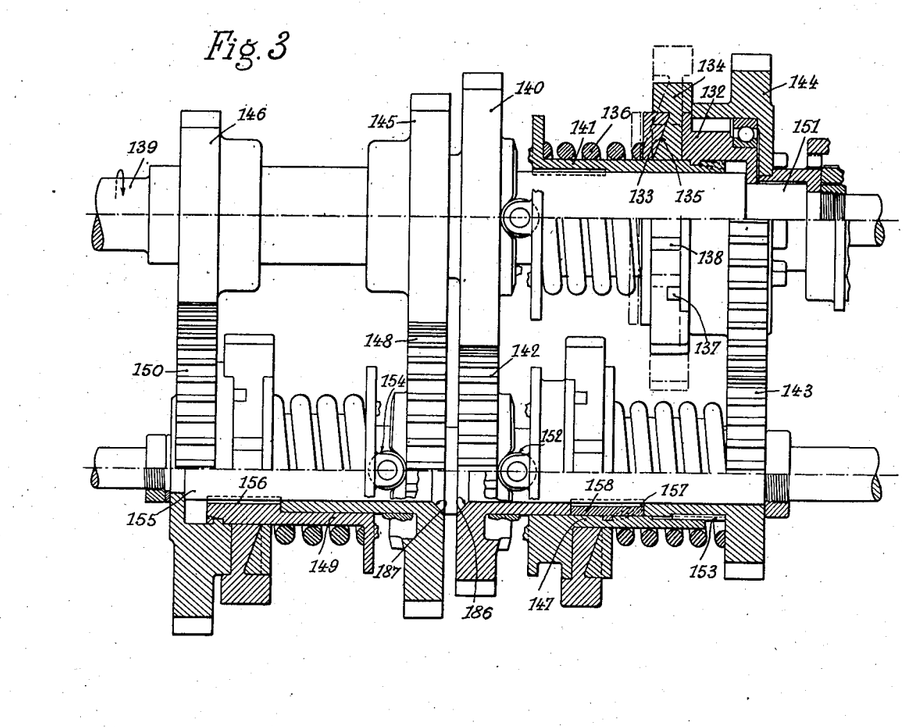
Fig. 3 is an elevational view, with parts in section, of a third embodiment of this invention, in the case of a four speed box.

Fig. 3 shows a third embodiment of the invention, in the case of a four speed box as well as a modified form of the centrifugal masses, which affords a reduction in the general size. Between a nut 132 corresponding to the nut 24 shown in Fig. 1, and a washer 133 corresponding to the washer 23 of Fig. 1, are held heavy centrifugal masses 134. Ribs with inclined faces 135 are provided on the washer 133 and are engaged in recesses 190 provided in the masses 134, the end wall of said recesses having the same inclination as the inclined faces of the ribs 135. When proceeding from the position shown in full lines to the position shown in dot-and-dash lines, said masses move washer 133 to the left and compress spring 136, due to the inclined faces of the ribs 135 and of the recess 190; said masses 134 are guided laterally by studs 137 carried on the nut 132, and their movement is limited by appendages 138 of said masses 134 cooperating with the studs 137. Their function is similar to that of the masses 30 shown in Fig. 1.

The devices for automatically disengaging the pinions are practically similar to those shown in Fig. 1. The particular feature of the apparatus consists especially in the connection of the pinions and the counter-shaft between the first and the second speed.

Upon driving shaft 139 is keyed an ordinary pinion 140 and said shaft further carries two loose wheel pinions 145 and 146.

The position shown in Fig. 3 is the position of direct drive, or fourth speed.

When sleeve 141 moves away from pinion 140 (i. e. from the driving shaft) the latter drives the vehicle at the third speed, through pinions 142, 143 and 144. Sleeve 141, in its movement, compresses spring 136, and the driving torque of pinion 140 is transmitted to a shaft 151, connected with the shaft to be driven, through the following devices: pinion 142 drives sleeve 147, through rollers 152; said sleeve drives pinion 143 by means of its key 153; pinion 143 then drives pinion 144 which, through the rollers of the loose wheel, rotates nut 132. Due to its screw-threaded connection with sleeve 141, said nut holds said sleeve apart from pinion 140, and sleeve 141 keyed to shaft 151, rotates the latter and hence the shaft to be driven.

When pinion 142 is disconnected from sleeve 147 and is loose, the loose-wheel pinion 145 becomes operative and drives the vehicle on the second speed, through pinions 148, 143 and 144. In this case, the operative connection is as follows. Pinion 148 acts, through rollers 154, upon sleeve 149 which drives shaft 155 by means of the key 156; shaft 155, through key 157, rotates ring 158. Said ring 158 holds sleeve 147 apart from pinion 142, owing to the screwthreads provided between members 158 and 147, which are similar with the screw-threads 183 shown in Fig. 1; sleeve 147 is thus rotated and imparts movement to shaft 151 by the same intermediate devices as above described for the operation at third speed.

When pinion 148 is released from ring 149 and thus becomes loose, loose-wheel pinion 146 comes into action and drives the vehicle at first speed, through pinions 150, 143 and 144. In this case, pinion 150 acts by its screw-thread upon sleeve 149, thus holding it apart from pinion 148, while key 156 transmits the movement to shaft 155. The movement is transmitted from the shaft 155 to the shaft 151 by the intermediate parts above mentioned for operation at second speed and at third speed.

In the arrangement of Fig. 3, the collars of the rings 141, 147 and 149 act in the same manner as their corresponding parts in the examples of Figures 1 and 2 by suitable intermediate parts on a device slowing the engine (device not shown in Fig. 3).

It will be seen that when the rollers 152 and 154 have been separated from the pinions 142 and 148, these latter are loose on the shaft 155 and are adapted to take play. In order to automatically center said pinions on their shaft, when the rollers 152 and 154 again engage said pinions under the action of their springs, the hub of each of these pinions may be provided with a conical part 186 or 187 which under the pressure of the springs, will center the pinion against a corresponding conical shoulder carried by the shaft 155.

Shafts 139 and 151, the driven shaft (not shown), and counter-shaft 155, are suitably mounted in a casing, not shown.

It should be remarked that the various coupling devices with automatic release, with the exception of the one corresponding to direct drive, have been mounted, in the example described, on the intermediate shaft, in order to reduce the tension of the coupling springs, since the latter will take advantage of the reduction in speed ratio existing between the countershaft and the driven shaft.

The devices described may obviously be variously modified without departing from the principle of the invention. For example, use may be made of coupling devices with automatic release of a different type than the one represented in the drawings.

Having now described my invention what I claim as new and desire to secure by Letters Patent is:

1. In an automatic change speed mechanism, a driving shaft, a driven shaft, two coupling members rotatable with said driving and driven shafts, respectively, adapted to be brought towards and away from each other and provided with cooperating inclined surfaces adapted to connect operatively said shafts when engaging each other and to slide upon each other so as to separate said members from each other, resilient means adapted to press yieldingly said coupling members in engagement with each other and to yield when the resisting torque imposed to the driven shaft exceeds a determined value, a movable obturating member adapted to cover and to uncover the inclined surfaces of one coupling member, whereby the engagement with the inclined surfaces of the other coupling member is made respectively impossible and possible, stop means on said one coupling member adapted to limit the movement of said obturating member in two extreme positions in which said inclined surfaces on said one coupling member are respectively covered and uncovered, cooperating driving surfaces on said obturating member and on said other coupling member adapted to bring said obturating member into either extreme position according to the direction of the relative speeds between said coupling members, power transmission means connecting in parallel with said coupling members said driving shaft with the coupling member rotatable with said driven shaft and including a rotary member, and a free wheel mechanism associated with said rotary member, whereby the latter is loose when said coupling members are coupled and transmits power to said driven shaft when said coupling members are uncoupled.

2. In an automatic change speed mechanism, a driving shaft, a driven shaft, two coupling members rotatable with said driving and driven shafts respectively, adapted to be brought towards and away from each other and provided the one with a roller race interrupted by at least one notch with sloping faces and the other with at least one roller adapted to roll on said race in the uncoupling position and to enter said notch and to lock said members in rotation in the coupling position, resilient means adapted to press yieldingly said coupling members in the coupling position and to yield when the resisting torque imposed to the driven shaft exceeds a determined value, an obturating ring adapted to cover and to uncover said notch, whereby the engagement of said roller with said notch is made respectively impossible and possible, stop means on said roller race adapted to limit the movement of said obturating ring in two extreme positions in which said notch is respectively covered and uncovered, cooperating driving surfaces on said obturating ring and on the roller carrying coupling member adapted to bring said obturating ring into either extreme position according to the direction of the relative speeds between said coupling members, power transmission means connecting in parallel with said coupling members said driving shaft with the coupling member rotatable with said driven shaft and including a rotary member, and a free wheel mechanism associated with said rotary member, whereby the latter is loose when said coupling members are coupled and transmits power to said driven shaft when said coupling members are uncoupled.

3. In an automatic change speed mechanism, a driving shaft, a driven shaft, two coupling members rotatable with said driving and driven shafts respectively, adapted to be brought towards and away from each other and provided with cooperating inclined surfaces adapted to connect operatively said shafts when engaging each other and to slide upon each other so as to separate said members from each other, a one way clutch mounted on the coupling member on said driven shaft, a toothed wheel carried by said one way clutch and adapted to rotate said one way clutch, power transmission means connecting in parallel with said coupling members said driving shaft with said toothed wheel, resilient means bearing on one side on said one way clutch and on the other side on said coupling member on said driven shaft and adapted to press yieldingly said coupling members in engagement with each other and to yield when the resisting torque imposed to the driven shaft exceeds a determined value, cooperating surfaces on said one way clutch and on said coupling member on the driven shaft adapted to move said coupling member on the driven shaft away from the coupling member on the driving shaft against the action of said resilient means when said one way clutch is rotated by said power transmission means and to allow said coupling member on the driven shaft to move towards the coupling member on the driving shaft under the action of said resilient means, and a stop member on said driven shaft adapted to limit the displacement of the coupling member on said driven shaft away from the coupling member on said driving shaft.

4. An automatic change speed mechanism according to claim 3, in which said cooperating surfaces are in the form of screwthreads.

5. An automatic change speed mechanism according to claim 3, in which said cooperating surfaces are in the form of screwthreads, the pitch of said screwthreads being so chosen with relation to the inclination of said inclined surfaces on said coupling members that the two coupling members are urged into the coupling position for a resisting torque different from the resisting torque which causes the two coupling members to be brought into the uncoupling position.

6. In an automatic change speed mechanism, a driving shaft, a driven shaft, two coupling members rotatable with said driving and driven shafts respectively, adapted to be brought towards and away from each other and provided with cooperating inclined surfaces adapted to connect operatively said shafts when engaging each other and to slide upon each other so as to separate said members from each other, resilient means adapted to press yieldingly said coupling members in engagement with each other and to yield when the resisting torque imposed to the driven shaft exceeds a determined value, a countershaft, a first one way clutch mounted on the coupling member on said driven shaft, a toothed wheel carried by said one way clutch and adapted to rotate said one way clutch about said coupling member on said driven shaft, a first gear wheel secured on said countershaft and adapted to mesh with said toothed wheel, two gear wheels secured on said driving shaft, a second gear wheel loosely mounted on said countershaft and adapted to mesh with one of the wheels on said driving shaft, two coupling parts rotatable with said countershaft and with said second gear wheel on said countershaft respectively, adapted to be brought towards and away from each other and provided the one with a roller race interrupted by at least one notch with sloping faces and the other with at least one roller adapted to roll on said race in the uncoupling position and to enter said notch and to lock said coupling parts in rotation in the coupling position, resilient means adapted to press yieldingly said coupling parts in the coupling position and to yield when the resisting torque imposed to the countershaft exceeds a determined value, a second one way clutch mounted on the coupling part rotatable with said countershaft, and a toothed wheel carried by said second one way clutch and adapted to rotate said second one way clutch and to mesh with the other of said wheels on said driving shaft.

7. In an automatic change speed mechanism according to claim 6, the further feature consisting in the fact that said roller race is inclined with relation to said countershaft, in such a direction as to facilitate return movement of the roller to the coupling position.

8. In an automatic change speed mechanism, a driving shaft, a driven shaft, means for coupling said shafts, means responsive to the resisting torque imposed to the driven shaft for uncoupling said coupling device, power transmission means connecting said shafts in parallel with said coupling means and including a rotary member, a free wheel mechanism associated with said rotary member, whereby the latter is loose when said coupling device is engaged and transmits power to said driven shaft when said coupling device is uncoupled, a set of levers connecting the movable member of said coupling means with the carburettor throttle used for the admission of gas to the engine, said set of levers embodying a catch device which closes this throttle upon displacement of the movable member towards the coupling position and again opens said throttle upon beginning of the re-engagement of the two parts of said coupling device.

9. An automatic change speed mechanism according to claim 8, wherein a second set of levers connected with the accelerator pedal is pivoted to said first set of levers connected with the movable member of said coupling means in such manner that the accelerator pedal and said movable coupling member will act upon the throttle independently of each other.

10. In an automatic change speed mechanism, a driving shaft, a driven shaft, two cooperating coupling members rotatable with said driving and driven shafts respectively and adapted to be brought towards and away from each other, a first one way clutch mounted on the coupling member on said driven shaft, a first toothed wheel carried by said one way clutch and adapted to rotate said one way clutch, means responsive to the resisting torque imposed to the driven shaft and bearing on one side on said first one way clutch and on the other side on said coupling member on said driven shaft and adapted to press yieldingly said coupling members in engagement with each other, a countershaft, a first gear wheel secured on said countershaft and adapted to mesh with said toothed wheel, two gear wheels secured on said driving shaft, a second gear wheel loosely mounted on said countershaft and adapted to mesh with one of the wheels on said driving shaft, two cooperating coupling parts rotatable with said countershaft and with said second gear wheel on said countershaft respectively and adapted to be brought towards and away from each other, a second one way clutch mounted on the coupling part rotatable with said countershaft, a second toothed wheel carried by said second one way clutch and adapted to rotate said second one way clutch and to mesh with the other of said wheels on said driving shaft, means responsive to the resisting torque imposed to the countershaft and bearing on one side on said second one way clutch and on the other side on said coupling part rotatable with said countershaft and adapted to press yieldingly said coupling parts in engagement with each other, two series of cooperating surfaces respectively between the coupling member on the driven shaft and said first one way clutch and between the coupling part on said countershaft and the second one way clutch adapted to move respectively said coupling member on the driven shaft and said coupling part on said countershaft apart from the other cooperating coupling member and coupling part against the action of said torque responsive means when said one way clutches are rotated by said toothed wheels and to allow said coupling member on the driven shaft and said coupling part on said countershaft to move towards the other cooperating coupling member and coupling part under the effect of said torque responsive means, a catch device connected with the carburettor throttle used for the admission of gas to the engine and adapted to open and to close said throttle, two movable arms connected the one with the movable coupling member on the driven shaft and the other with the movable coupling part on the countershaft, said arms being similarly disposed with relation to said catch device when said coupling members and said coupling parts are in the coupling position and each being adapted to make said catch device inoperative between the moment when said coupling members or said coupling parts are brought from their coupling position into their uncoupling position and the moment when said coupling members or said coupling parts are separated by said cooperating surfaces, whereby the catch device made inoperative by one arm is not adapted to be acted upon by the other arm during this period, each arm being also adapted out of said period to act upon said catch device and to close said throttle when said corresponding coupling members or coupling parts are brought towards their coupling position and to release said catch device and to again open said throttle upon beginning of the reengagement of the coupling members or coupling parts.

11. In an automatic change speed mechanism, a driving shaft, a driven shaft, two coupling members rotatable with said driving and driven shafts respectively, adapted to be brought towards and away from each other and provided with cooperating inclined surfaces adapted to connect operatively said shafts when engaging each other and to slide upon each other so as to separate said members from each other, stop means on said driven shaft, a sliding member on said driven shaft adapted to be brought into contact with said stop means, resilient means bearing on one side on said sliding member and on the other side on said coupling member rotatable with said driven shaft and adapted to press yieldingly said sliding member against said stop means and said coupling member rotatable with said driven shaft towards said coupling member rotatable with said driving shaft, centrifugal masses adapted to rotate in unison with the coupling member on said driven shaft and to urge said sliding member and said resilient means towards said coupling member rotatable with said driven shaft so as to increase with the speed of said driven shaft the force with which said resilient means press said coupling members in engagement, power transmission means connecting in parallel with said coupling members said driving shaft with the coupling member rotatable with said driven shaft and including a rotary member, and a free wheel mechanism associated with said rotary member, whereby the latter is loose when said coupling members are coupled and transmits power to said driven shaft when said coupling members are uncoupled.

12. In an automatic change speed mechanism, a driving shaft, a driven shaft, means for coupling said shafts, means responsive to the resisting torque imposed to the driven shaft for uncoupling said coupling means, a countershaft, two gear wheels rotatable with said countershaft, a gear wheel loosely mounted on said driving shaft and in mesh with one of the wheels on said countershaft, a gear wheel loosely mounted on said driven shaft and in mesh with the other wheel on said countershaft, and clutching means adapted to be operated by said coupling members and to connect said gear wheels on the driving shaft and on the driven shaft respectively with their corresponding shaft when said coupling means are brought into the uncoupling position.

13. In an automatic change speed mechanism, a driving shaft, a driven shaft, two coupling members rotatable with said driving and driven shafts respectively, adapted to be brought towards and away from each other and provided with cooperating inclined surfaces adapted to connect operatively said shafts when engaging each other and to slide upon each other so as to separate said members from each other, resilient means adapted to press yieldingly said coupling members in engagement with each other and to yield when the resisting torque imposed to the driven shaft exceeds a determined value, centrifugal masses adapted to rotate in unison with the coupling member on said driven shaft and to urge said resilient means towards said coupling members with a force increasing with the speed of said driven shaft, a set of levers connecting the movable coupling member with the carburettor throttle used for the admission of gas to the engine and embodying a catch device which closes this throttle upon displacement of the movable coupling member towards the coupling position before release of said clutching means and again opens said throttle upon beginning of the reengagement of said coupling members, power transmission means connecting in parallel with said coupling members said driving shaft with the coupling member rotatable with said driven shaft and including a rotary member, and a free wheel mechanism associated with said rotary member, whereby the latter is loose when said coupling members are coupled and transmits power to said driven shaft when said coupling members are uncoupled.

14. In an automatic change speed mechanism, a driving shaft, a driven shaft, two coupling members rotatable with said driving and driven shafts respectively, provided with cooperating inclined surfaces adapted to engage each other directly in the coupling position and to slide automatically against each other so that said inclined surfaces are moved apart and are made independent of each other in the uncoupling position, resilient means adapted to press yieldingly said coupling members in engagement with each other and to yield when the resisting torque imposed to the driven shaft exceeds a determined value, power transmission means connecting in parallel with said coupling members said driving shaft with the coupling member rotatable with said driven shaft and including a rotary member, and a free wheel mechanism associated with said rotary member, whereby the latter is loose when said coupling members are coupled and transmits power to said driven shaft when said coupling members are uncoupled.

15. In an automatic change speed mechanism according to claim 14, the further feature consisting in that said inclined surfaces on said coupling members comprise the one a roller race interrupted by at least one notch with sloping faces and the other by at least one roller adapted to roll on said race in the uncoupling position and to enter said notch and to lock said members in rotation in the coupling position.

ALFRED ATHIMON.